(12) United States Patent
Nishino et al.

(10) Patent No.: US 11,063,498 B2
(45) Date of Patent: Jul. 13, 2021

(54) CONDUCTOR SHAPING APPARATUS

(71) Applicant: TOYOTA JIDOSHA KABUSHIKI KAISHA, Toyota (JP)

(72) Inventors: Junki Nishino, Toyota (JP); Hiromitsu Kuraoka, Toyota (JP); Toshiaki Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 16/229,707

(22) Filed: Dec. 21, 2018

(65) Prior Publication Data
US 2019/0199181 A1    Jun. 27, 2019

(30) Foreign Application Priority Data

Dec. 27, 2017 (JP) .............................. JP2017-251668

(51) Int. Cl.
  *B23P 19/00* (2006.01)
  *H02K 15/00* (2006.01)
  *H02K 15/04* (2006.01)

(52) U.S. Cl.
  CPC ..... *H02K 15/0025* (2013.01); *H02K 15/0081* (2013.01); *H02K 15/0421* (2013.01); *Y10T 29/53143* (2015.01)

(58) Field of Classification Search
  CPC ....... B21F 1/004; B21F 1/008; H02K 15/045; H02K 15/0056; H02K 15/04; H02K 15/0421; Y10T 29/53143; Y10T 29/53161; Y10T 29/49822; Y10T 29/49009; B21D 11/10
  USPC .... 29/732, 34 R, 596, 592.1, 721, 729, 736, 29/825, 874, 882
  See application file for complete search history.

(56) References Cited

U.S. PATENT DOCUMENTS 7,480,987 B1 *  1/2009  Guercioni .......... H02K 15/0421
                                                          29/592.1
8,683,679 B2 *  4/2014  Guercioni .......... H02K 15/0421
                                                            29/732

(Continued)

FOREIGN PATENT DOCUMENTS

| CN | 105706344 A | 6/2016 |
|---|---|---|
| JP | 2013-176295 | 9/2013 |
| JP | 2015-100251 A | 5/2015 |

(Continued)

*Primary Examiner* — Thiem D Phan
(74) *Attorney, Agent, or Firm* — Oblon, McClelland, Maier & Neustadt, L.L.P.

(57) ABSTRACT

A conductor shaping apparatus includes a first shaping die, a second shaping die and a holding section configured to hold the conductor and rotates the second shaping die about a rotational axis with respect to the first shaping die, and it further includes a first movement restricting portion formed in the first shaping die and configured to contact with a portion of the conductor so as to restrict a movement of the conductor together with the second shaping die when the second shaping die is rotated in a direction approaching the first shaping die, and a second movement restricting portion that is formed in the first shaping die and is configured to contact with a portion of the conductor so as to restrict the movement of the conductor together with the second shaping die when the second shaping die is rotated in a direction apart from the first shaping die.

9 Claims, 13 Drawing Sheets

(56) References Cited

U.S. PATENT DOCUMENTS

2016/0248306 A1 8/2016 Hashimoto et al.
2017/0117782 A1 4/2017 Hirao

FOREIGN PATENT DOCUMENTS

| | | |
|---|---|---|
| JP | 2017-085701 | 5/2017 |
| JP | 2017-093197 | 5/2017 |

* cited by examiner

CONDUCTOR SHAPING APPARATUS

CROSS-REFERENCE TO RELATED APPLICATION

The present disclosure claims priority to Japanese Patent Application No. 2017-251668 filed on 27 Dec. 2017, which is incorporated herein by reference in its entirety including specification, drawings and claims.

TECHNICAL FIELD

The present disclosure relates to a conductor shaping apparatus to form a bent portion in a conductor.

BACKGROUND

A conventionally known conductor shaping apparatus includes a fixed die, a movable die that is rotated about a rotational axis, and a cam mechanism (as shown in, for example, Patent Literature 1). The conductor shaping apparatus forms at least one first bent portion that is bent in a flatwise direction of a conductor, at least one second bent portion that is bent in an edgewise direction substantially orthogonal to the flatwise direction and a third bent portion that is bent in the edgewise direction near a distal end of the conductor. In the conductor shaping apparatus, the first bent portion is formed in the conductor by a first shaping surface of the fixed die and a second shaping surface of the movable die when the movable die is rotated in a first direction about the rotating axis with respect to the fixed die. Then, the second edgewise bending portion of the movable die presses the conductor against a first edgewise bending portion of the fixed die so as to form the second bent portion in the conductor when the movable die is further rotated in the first direction after the first bent portion is formed. The fixed dies is slightly rotated together with the movable die when the movable die is further rotated in the first direction after the second bent portion is formed, so that a cam member is rotated while contacting with a fixed cam follower so as to form the third bent portion in the conductor.

CITATION LIST

Patent Literature

PTL1: Japanese Patent Application Laid Open No. 2017-93197

SUMMARY

In the above conventional conductor shaping apparatus, the conductor may be pressed by the movable die and may move in a rotational direction when the movable die is rotated with respect to the fixed die. Thus, the conductor may not be properly clamped between the fixed die and the movable die, so that a shaping accuracy of the bent portions may deteriorate. Further, the conductor may be pressed against the shaping surfaces of the fixed and movable dies by springback (especially, springback in the flatwise direction) generated during shaping (bending). Thus, the conductor may be dragged and deformed by the movable die when the movable die is rotated so as to be separated from the fixed die, so that the shaping accuracy of the bent portions may deteriorate.

A subject matter of the disclosure is to accurately form an edgewise bent portion and a flatwise bent portion in a conductor by rotating a second shaping die about a rotational axis with respect to a first shaping die.

The disclosure is directed to a conductor shaping apparatus that includes a first shaping die, a second shaping die and a holding section configured to hold the conductor and is configured to rotate the second shaping die about a rotational axis with respect to the first shaping die so as to form an edgewise bent portion and a flatwise bent portion in the conductor held by the holding section. The conductor shaping apparatus further includes a first movement restricting portion that is formed in the first shaping die and is configured to contact with a portion of the conductor so as to restrict a movement of the conductor together with the second shaping die when the second shaping die is rotated in a direction approaching the first shaping die, and a second movement restricting portion that is formed in the first shaping die and is configured to contact with a portion of the conductor so as to restrict the movement of the conductor together with the second shaping die when the second shaping die is rotated in a direction apart from the first shaping die.

In the conductor shaping apparatus of the disclosure, the first movement restricting portion contacts with the portion of the conductor when the second shaping die is rotated in the direction approaching the first shaping die. Thus, the movement of the conductor together with the second shaping die is restricted by the first movement restricting portion even though the second shaping die presses the conductor forward in a rotational direction of the second shaping die, so that the conductor is properly clamped between the first and second shaping dies. Further, the second movement restricting portion contacts with the portion of the conductor so as to restrict the movement of the conductor together with the second shaping die when the second shaping die is rotated in the direction apart from the first shaping die. This configuration prevents the conductor from being dragged and deformed by the second shaping die when the second shaping die is rotated in the direction apart from the first shaping die even though the conductor is pressed against shaping surfaces of the first and second shaping dies by springback generated during shaping. As a result, the conductor shaping apparatus enables the edgewise bent portion and the flatwise bent portion to be accurately formed in the conductor by rotating the second shaping die about the rotational axis with respect to the first shaping die.

The first shaping die may be a lower die disposed below the second shaping die and may include a first flatwise shaping surface configured to form the flatwise bent portion and a first edgewise shaping surface that extends along the first flatwise shaping surface so as to form the edgewise bent portion. The second shaping die may be an upper die formed not to interfere with the first and second movement restricting portions of the first shaping die and may include a second flatwise shaping surface configured to form the flatwise bent portion and a second edgewise shaping surface that extends along the second flatwise shaping surface so as to form the edgewise bent portion. The first movement restricting portion may protrude upward from a surface of a stepped portion including the first edgewise shaping surface and may include a first contact surface that continues to a portion of the first edgewise shaping surface and extends upward. The second movement restricting portion may protrude upward from beside the first flatwise shaping surface so as to oppose to a portion of the first edgewise shaping surface. This configuration enables the conductor to properly contact with the first and second flatwise shaping surfaces and the first and second edgewise shaping surfaces when the second shaping die is rotated in the direction approaching the first shaping die. Further, this configuration satisfactorily prevents the conductor from being dragged and deformed by the second flatwise shaping surface and the second edgewise shaping surface of the second shaping die when the second shaping die is rotated in the direction apart from the first shaping die.

A height of the first movement restricting portion may be defined so as to make an upper end of the first contact surface oppose to at least a portion of the conductor that is held by the holding section and extends horizontally. A height of the second movement restricting portion may be defined equal to or smaller than a thickness of the conductor in a flatwise direction.

The first and second movement restricting portions may be arranged in the first shaping die along a circular arc that extends about the rotational axis so as to be respectively adjacent to the first flatwise shaping surface. The second shaping die may be configured to include a circular arc recessed portion into which the first and second movement restricting portions are inserted when the second shaping die is rotated in the direction approaching the first shaping die. In this conductor shaping apparatus, the movement of the conductor is properly restricted by the first and second movement restricting portions of the first shaping die and an interference between the second shaping die and the first and second movement restricting portions is prevented.

The conductor shaping apparatus may further include a conductor guide portion that is disposed in an installation place of the conductor shaping apparatus so as to contact with a side surface of a distal end portion of the conductor when the conductor is gradually bent in an edgewise direction, the contact between the conductor guide portion and the conductor being released as the conductor is gradually bent in a flatwise direction. This conductor shaping apparatus enables the conductor to be bent in the edgewise and flatwise directions while preventing the conductor to cross over the shaping surface for the edgewise bent portion when the second shaping die is rotated in the direction approaching the first shaping die, thereby enabling the edgewise and flatwise bent portions to be accurately formed in the conductor.

The conductor shaping apparatus may further include a first drive source configured to apply driving force to the first shaping die and to rotate the first shaping die about the rotational axis, and a second drive source configured to apply driving force to the second shaping die and to rotate the second shaping die about the rotational axis. In this conductor shaping apparatus, the first drive source applies driving force to the first shaping die and the second drive source applies driving force to the second shaping die when the second shaping die is rotated in the direction approaching the first shaping die so that the conductor is tightly clamped between the first and second shaping dies, thereby enabling the edgewise and flatwise bent portions to be accurately formed in the conductor.

The conductor shaping apparatus may further include a controller programmed to control the first and second drive sources so as to rotate the second shaping dies about the rotational axis with respect to the first shaping dies, the controller programmed to control the first and second drive sources so as to integrally rotate the first and second shaping dies about the rotational axis, and a distal end shaping portion configured to contact with a distal end portion of the conductor so as to form the edgewise bent portion in a most distal end side when the first and second shaping dies are integrally rotated about the rotational axis.

The holding section may include a proximal end shaping portion configured to contact with the conductor so as to form the edgewise bent portion in a most proximal end side when the first and second shaping dies are integrally rotated about the rotational axis.

The conductor may be a bus bar portion that extends from one end of a coil. The holding section may be configured to hold the coil. That is, the conductor shaping apparatus according to the disclosure enables the edgewise and flatwise bent portions to be accurately formed in the bus bar portion that extends from the one end of the coil.

DESCRIPTION OF EMBODIMENTS

The following describes some embodiments of the disclosure with reference to drawings.

Figure 1:
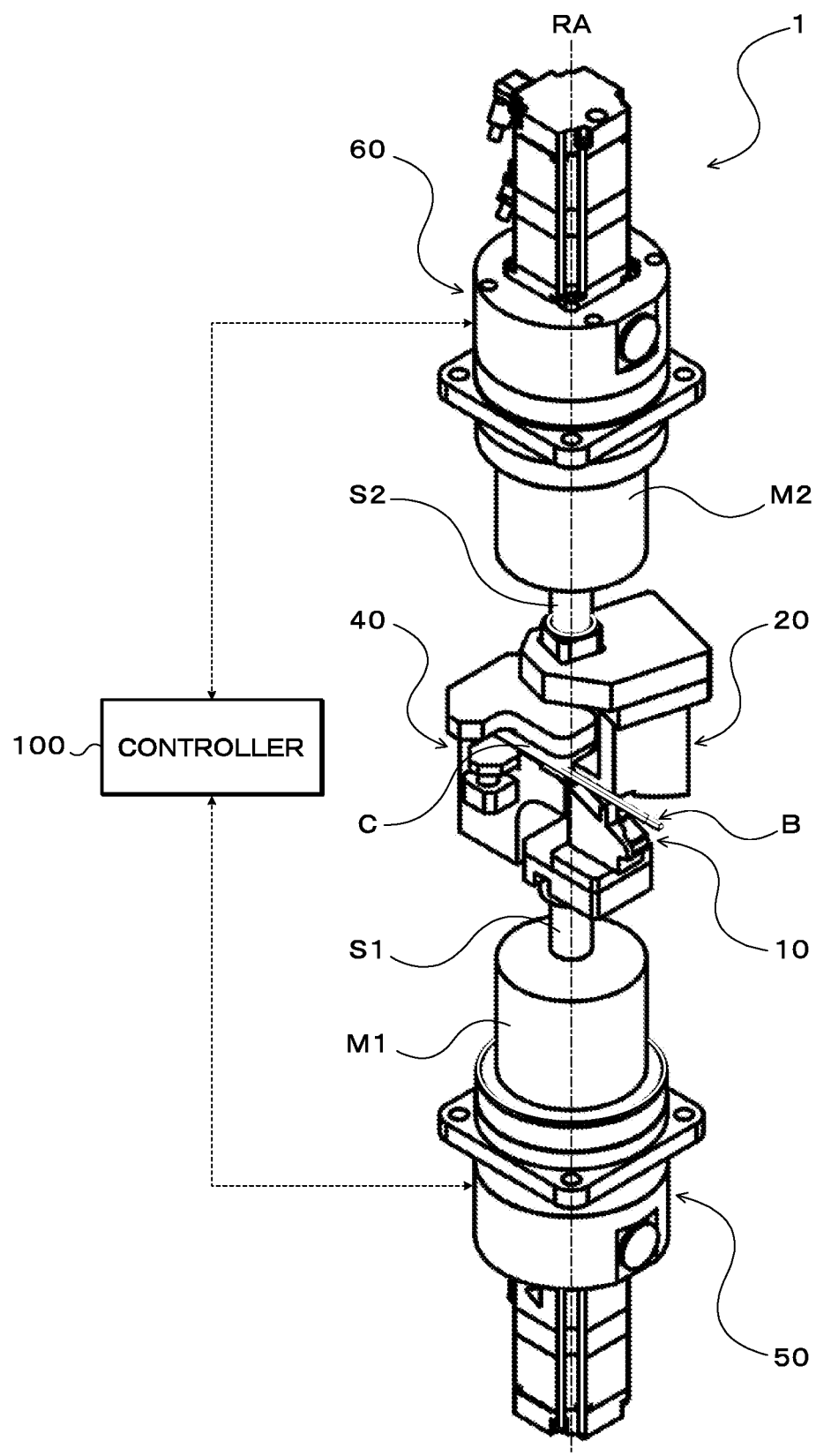
FIG. 1 is a schematic configuration diagram illustrating a conductor shaping apparatus according to the disclosure.

FIG. 1 is a schematic configuration diagram illustrating a conductor shaping apparatus 1 according to the disclosure. The conductor shaping apparatus 1 of FIG. 1 is configured to shape a long bus bar portion B that extends from one end of a coil C shown in FIG. 2. The coil C is a rectangular coil (cassette coil) of a concentrated winding type that is formed by winding one rectangular wire (conductor) in two layers and multi columns (for example 6-10 columns) while bending the rectangular wire in an edgewise direction. For example, the coil C is applied to a three-phase AC motor mounted on an electric vehicle, a hybrid vehicle or the like. The coil C has a substantially truncated square pyramid outer shape and includes a short lead portion (terminal portion) L that extends from the other end of the coil C. As shown in the figure, the bus bar portion B extends in a direction apart from the lead portion L. The coil C is fitted to teeth of a stator core of the motor together with a plastic insulator, for example. The bus bar portion B is electrically connected (welded) to the lead portion L of the corresponding coil C. As a result, U phase, V phase and W phase stator coils are wound on the stator. In the bus bar portion B and the lead portion L, an insulating layer of the rectangular wire is removed from a distal end within a predetermined area.

Figure 2:
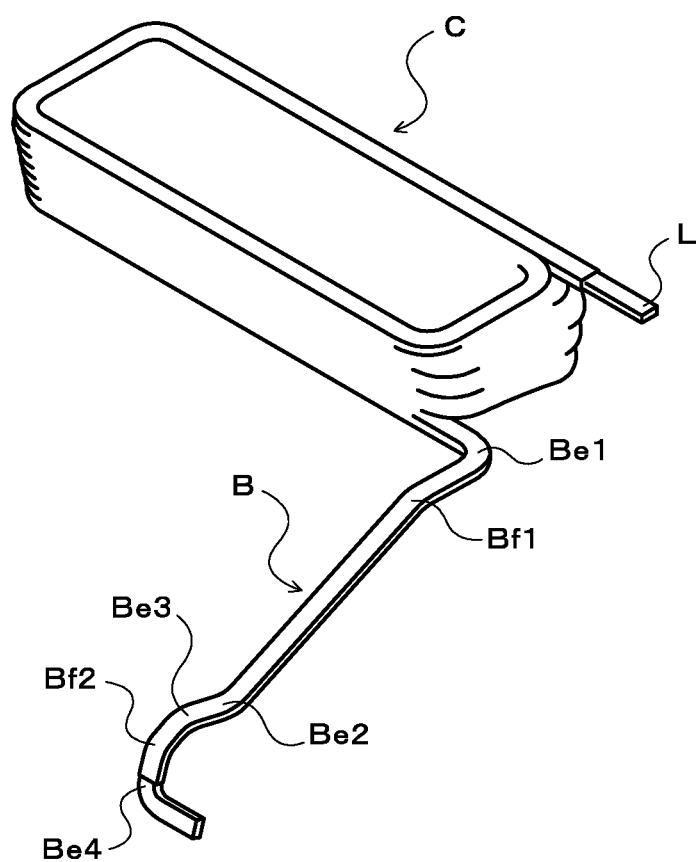
FIG. 2 is a perspective view illustrating a coil with a bus bar portion that is shaped by the conductor shaping apparatus of FIG. 1.

As shown in FIG. 2, the bus bar portion B of the coil C is configured to include a plurality of edgewise bent portions (first bent portions) Be1, Be2, Be3 and Be4 that are bent in the edgewise direction (first bent direction: a direction substantially orthogonal to short sides of a cross section of the rectangular wire) and a plurality of flatwise bent portions (second bent portions) Bf1 and Bf2 that are bent in a flatwise direction (second bent direction: a direction substantially orthogonal to long sides of the cross section of the rectangular wire). In the embodiment, the edgewise bent portion Be1 in a most proximal end side (root side) and the edgewise bent portion Be4 in a most distal end side are bent in opposite directions each other. The edgewise bent portions Be2 and Be3 between the edgewise bent portions Be1 and Be4 are bent in opposite directions each other. Further, the flatwise bent portion Bf1 is formed between the edgewise bent portions Be1 and Be2. The flatwise bent portion Bf2 is formed between the edgewise bent portions Be3 and Be4. The flatwise bent portions Bf1 and Bf2 are bent in opposite directions each other.

Figure 3:
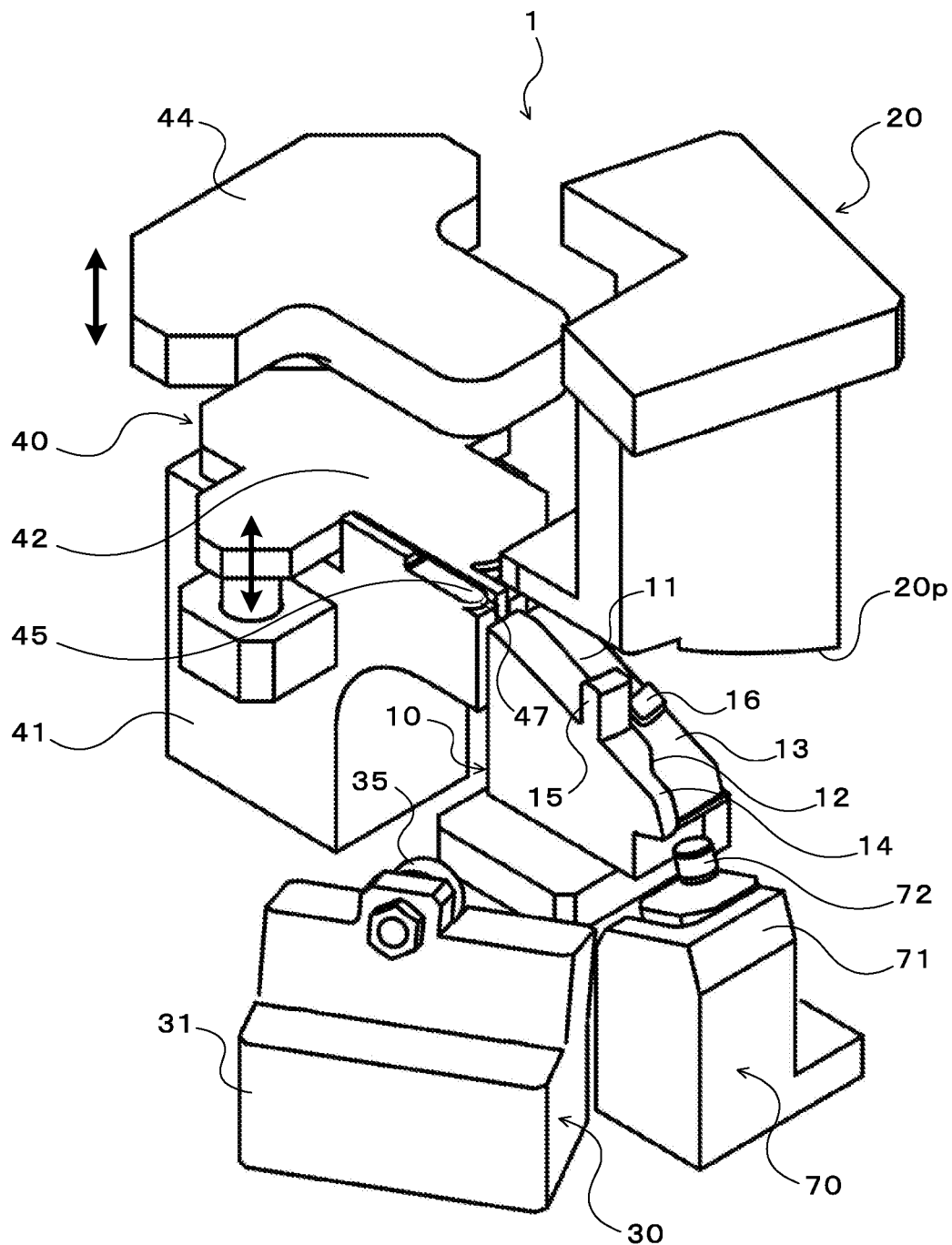
FIG. 3 is a perspective view illustrating the conductor shaping apparatus according to the disclosure.

As shown in FIGS. 1 and 3, the conductor shaping apparatus 1 is configured to include a first shaping die 10 and a second shaping die 20 to form the plurality of edgewise bent portions Be2, Be3 and the plurality of flatwise bent portions Bf1, Bf2 in the bus bar portion B of the coil C, a distal end shaping portion 30 (refer to FIG. 3) to form the edgewise bent portion Be4 in the distal end portion of the bus bar portion B, a coil holding section 40 configured to hold the coil C, a first driving device (first drive source) 50 with a drive shaft S1, a second driving device (second drive source) 60 with a drive shaft S2, and a controller 100 that controls the first and second driving devices 50, 60 and the coil holding section 40.

As shown in FIGS. 1 and 3, the first shaping die 10 is a lower die including a die surface on an upper side in the figures. A distal end of the drive shaft S1 of the first driving device 50 is fixed to a lower surface in the figures (surface opposite to the die surface) of the first shaping die 10. The second shaping die 20 is an upper die including a die surface capable of covering the die surface of the first shaping die on a lower side in the figures. A distal end of the drive shaft S2 of the second driving device 60 is fixed to an upper surface in the figures (surface opposite to the die surface) of the second shaping die 20. The distal end shaping portion and the coil holding section 40 are fixed to an installation place of the conductor shaping apparatus 1. The first driving device 50 is disposed (fixed) below the first shaping die 10 in FIG. 1 such that the drive shaft S1 coaxially extends with a rotational axis RA that extends in a vertical direction of the installation place of the conductor shaping apparatus 1. The second driving device 60 is disposed (fixed) above the second shaping die 20 in FIG. 1 such that the drive shaft S2 coaxially extends with the rotational axis RA.

Figure 4:
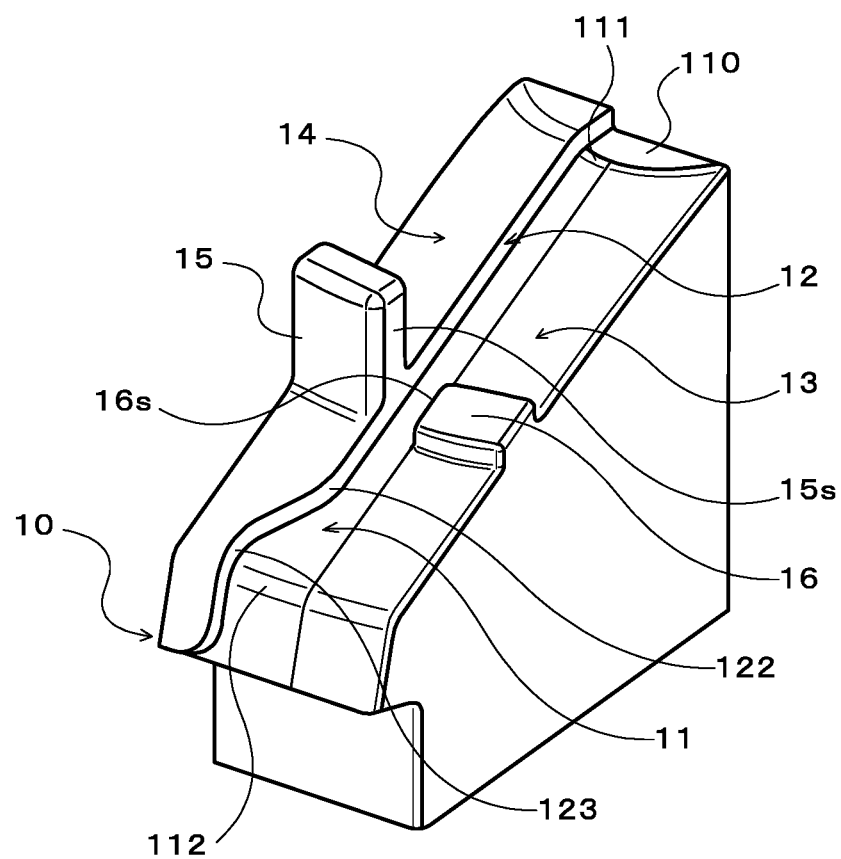
FIG. 4 is a perspective view illustrating a first shaping die of the conductor shaping apparatus according to the disclosure.

As shown in FIG. 4, the first shaping die 10 includes a first flatwise shaping surface 11 configured to form the flatwise bent portions Bf1 and Bf2 in the bus bar portion B of the coil C and a first edgewise shaping surface 12 configured to form the edgewise bent portions Be2 and Be3 in the bus bar portion B of the coil C as the die surface. The first flatwise shaping surface 11 of the first shaping die 10 includes a first curved surface (convex curved surface) 111 corresponding to a lower surface in FIG. 2 of the flatwise bent portion Bf1 and a second curved surface (convex curved surface) 112 corresponding to the lower surface in FIG. 2 of the flatwise bent portion Bf2. The first flatwise shaping surface 11 further includes a flat surface 110 that is disposed on the rotational axis RA side of the first curved surface 111 (upper side in FIG. 4) and corresponds to the lower surface in FIG. 2 of the bus bar portion B between the edgewise bent portion Be1 and the flatwise bent portion Bf1, a flat inclined surface that extends downward in FIG. 4 between the first and second curved surfaces 111 and 112 and corresponds to the lower surface in FIG. 2 of the bus bar portion B between the flatwise bent portions Bf1 and Bf2, and a flat inclined surface that extends downward in FIG. 4 on an opposite side of rotational axis RA with respect to the second curved surface 112 and corresponds to the lower surface in FIG. 2 of the bus bar portion B on the distal end side of the flatwise bent portion Bf2. In addition, a guide surface 13 is formed in an end portion of the first shaping die near the second shaping die 20. The guide surface 13 is configured to include a conical surface that extends about the rotational axis RA and continues to the flat surface, the curved surfaces and the inclined surfaces of the first flatwise shaping surface 11, and the like.

The first edgewise shaping surface 12 of the first shaping die 10 forms a side surface of a stepped portion 14 that is formed in the first shaping die 10 and extends along an end portion of the first shaping die 10 far from the second shaping die 20. The stepped portion 14 protrudes upward in FIG. 4 from the first flatwise shaping surface 11. The first edgewise shaping surface 12 extends upward in the figure from an edge portion of the first flatwise shaping surface 11 and extends along the edge portion. The first edgewise shaping surface 12 includes a first curved surface (convex curved surface) 122 corresponding to an outer side surface (inner side surface in FIG. 2: surface including the short side of the cross section of the rectangular wire) of the edgewise bent portion Be2 and a second curved surface (concave curved surface) 123 corresponding to the outer side surface of the edgewise bent portion Be3. The first edgewise shaping surface 12 further includes a flat surface that is disposed on the rotational axis RA side of the first curved surface (upper side in FIG. 4) and corresponds to the outer side surface of the bus bar portion B between the edgewise bent portions Be1 and Be2, a flat surface that extends between the first and second curved surfaces 122, 123 and corresponds to the outer side surface of the bus bar portion B between the edgewise bent portions Be2 and Be3, and a flat surface that is disposed in the opposite side of the rotational axis RA with respect to the second curved surface 123 and corresponds to the outer side surface of the bus bar portion B on the distal end side of the edgewise bent portion Be3.

Further, the first shaping die 10 includes a first movement restricting portion 15 and a second movement restricting portion 16. The first movement restricting portion 15 is a substantially square columnar (rodlike) protrusion that protrudes upward from a surface of the stepped portion 14 including the first edgewise shaping surface 12. The first movement restricting portion 15 includes a first contact surface 15s that continues to a portion of the first edgewise shaping surface 12 and extends upward. The second movement restricting portion 16 is a short protrusion that protrudes upward from beside the first flatwise shaping surface 11 (from a surface of the guide surface 13) so as to oppose to a portion of the first edgewise shaping surface 12. The second movement restricting portion 16 includes a second contact surface 16s that extends along the first flatwise shaping surface 11. The first and second movement restricting portions 15 and 16 are arranged in the first shaping die 10 along a circular arc that extends about the rotational axis RA. The first and second movement restricting portions 15 and 16 are respectively adjacent to the first flatwise shaping surface 11 and oppose to each other.

In the embodiment, lengths (thicknesses) of the first and second movement restricting portions 15 and 16 in a radial direction of the first shaping die 10 are defined substantially the same. A height of the first movement restricting portion (height from the flatwise shaping surface 11) is defined to make an upper end of the first contact surface 15s oppose to at least a portion of the side surface (side surface including the short sides) of the bus bar portion B when the bus bar portion B (rectangular wire) of the coil C contacts with the flat surface 110 of the first shaping die 10 and extends horizontally. Further, a height of the second movement restricting portion 16 from the first flatwise shaping surface 11 is defined equal to or smaller than a thickness of the bus bar portion B in the flatwise direction. The first and second movement restricting portions 15 and 16 are formed in a position apart from the first and second curved surfaces 111 and 112 of the first edgewise shaping surface 11 and the first and second curved surfaces 122 and 123 of the first edgewise shaping surface 12 to some extent. That is, the first and second movement restricting portions 15 and 16 are formed in the position apart from the rotational axis RA as far as possible so as to be close to an outer circumference of the first shaping die 10 as much as possible.

Figure 5:
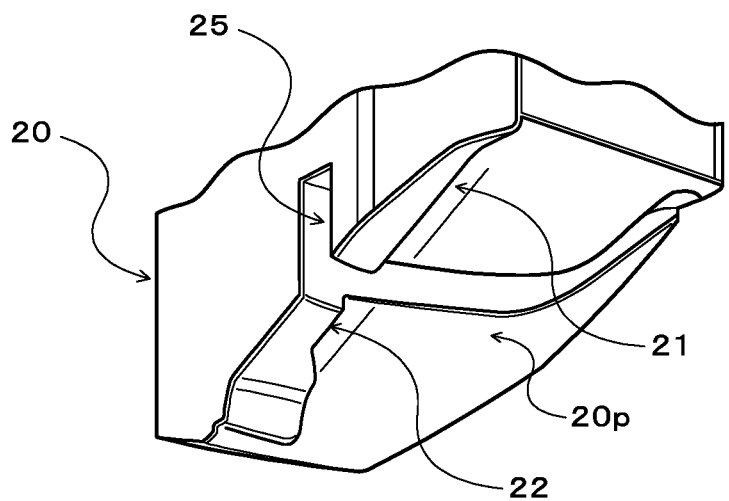
FIG. 5 is an enlarged perspective view illustrating a second shaping die of the conductor shaping apparatus according to the disclosure.

As shown in FIG. 5, the second shaping die 20 includes a pressing surface 20p that extends from an end portion near the first shaping die 10 toward an opposite end portion, a second flatwise shaping surface 21 configured to form the flatwise bent portions Bf1 and Bf2 in the bus bar portion B of the coil C, and a second edgewise shaping surface 22 configured to form the edgewise bent portions Be2 and Be3 in the bus bar portion B of the coil C. The pressing surface 20p has a substantially circular sector planar shape that extends about the rotational axis RA. The pressing surface 20p is formed such that a surface shape thereof gradually changes about the rotational axis RA from a distal end portion having a shape corresponding to that of the bus bar portion B that extends straight before shaping to an end portion on the second flatwise shaping surface 21 side that has a shape corresponding to that of the bus bar portion B after shaping.

The second flatwise shaping surface 21 of the second shaping die 20 continues to the pressing surface 20p and includes a first curved surface (concave curved surface) corresponding to an upper surface in FIG. 2 of the flatwise bent portion Bf1 and a second curved surface (concave curved surface) corresponding to the upper surface in FIG. 2 of the flatwise bent portion Bf2. The second flatwise shaping surface 21 further includes a flat surface that is disposed on the rotational axis RA side of the first curved surface and corresponds to the upper surface in FIG. 2 of the bus bar portion B between the edgewise bent portion Be1 and the flatwise bent portion Bf1, a flat inclined surface that extends downward in FIG. 5 between the first and second curved surfaces and corresponds to the upper surface in FIG. 2 of the bus bar portion B between the flatwise bent portions Bf1 and Bf2, and a flat inclined surface that extends downward in FIG. 5 on the opposite side of rotational axis RA with respect to the second curved surface and corresponds to the upper surface in FIG. 2 of the bus bar portion B on the distal end side of the flatwise bent portion Bf2.

The second edgewise shaping surface 22 of the second shaping die 20 forms a side surface of a stepped portion 24 that is formed in the second shaping die 20 so as to extend along an end portion far from the first shaping die 10. The stepped portion 24 protrudes downward in FIG. 5 from the second flatwise shaping surface 21. The second edgewise shaping surface 22 extends downward in the figure from an edge portion of the second flatwise shaping surface 21 and extends along the edge portion. The second edgewise shaping surface 22 includes a first curved surface (concave curved surface) corresponding to an inner side surface (front side surface in FIG. 2) of the edgewise bent portion Be2 and a second curved surface (convex curved surface) corresponding to the inner side surface of the edgewise bent portion Be3. The second edgewise shaping surface 22 further includes a flat surface that is disposed on the rotational axis RA side of the first curved surface and corresponds to the inner side surface of the bus bar portion B between the edgewise bent portions Be1 and Be2, a flat surface that extends between the first and second curved surfaces and corresponds to the inner side surface of the bus bar portion B between the edgewise bent portions Be2 and Be3, and a flat surface that is disposed in the opposite side of the rotational axis RA with respect to the second curved surface and corresponds to the inner side surface of the bus bar portion B on the distal end side of the edgewise bent portion Be3.

Further, a recessed portion 25 is formed in the second shaping die 20 so as to divide the pressing surface 20p, the second flatwise shaping surface 21, the second edgewise shaping surface 22 and the stepped portion 24 into two regions. The recessed portion 25 is formed so as to extend along a circular arc about the rotational axis RA that is equivalent to an axis of the first and second movement restricting portions 15 and 16 of the first shaping die 10. The recessed portion 25 has a width (length in a radial direction of the second shaping die 20) larger than the lengths (thicknesses) of the first and second movement restricting portions 15 and 16 in the radial direction of the first shaping die 10 and a depth larger than the height of the first movement restricting portion 15.

As shown in FIG. 3, the distal end shaping portion 30 includes a supporting block 31 that is fixed to the installation place of the conductor shaping apparatus 1 and a shaping roller (shaping member) 35 that is supported rotatably about an axis that extends toward the rotational axis RA and extends slightly downward by the supporting block 31. The supporting block 31 is disposed on a downstream side in a rotational direction of the first shaping die 10 that is rotated from an initial position (stop position) thereof so as to be separated from the second shaping die 20 remaining at an initial position thereof. The supporting block 31 is disposed such that the shaping roller faces the first shaping die 10.

Further, a bus bar guide portion (conductor guide portion) 70 is disposed in the installation place of the conductor shaping apparatus 1 so as to be adjacent to the distal end shaping portion 30. The bus bar guide portion 70 includes a supporting block 71 that is fixed to the installation place of the conductor shaping apparatus 1 and a guide roller 72 that is supported rotatably about an axis that is slightly inclined with respect to the rotational axis RA by the supporting block 71. The supporting block 71 is disposed on an upstream side of the distal end shaping portion 30 in the rotational direction of the first shaping die 10 that is rotated so as to be separated from the second shaping die 20 remaining at the initial position thereof. The supporting block 71 is disposed such that the guide roller 72 faces the first shaping die 10.

As shown FIG. 3, the coil holding section 40 includes a supporting base 41 that is fixed to the installation place of the conductor shaping apparatus 1, a coil placing table 42 that is vertically movably supported by the supporting base 41, and a coil pressing plate 44 that is vertically movably supported by the supporting base 41. When the coil C conveyed by a coil conveyor is placed on the coil placing table 42 of the coil holding section 40, the coil placing table 42 is lowered by a driving mechanism (not shown) and the coil pressing plate 44 is lowered by the driving mechanism so as to contact with the coil C. As a result, the coil C is securely held (clamped) by the coil holding section 40. When a shaping of the coil C by the conductor shaping apparatus 1 is completed, the coil placing table 42 is raised by the driving mechanism and the coil pressing plate 44 is raised by the driving mechanism so as to be separated from the coil C. This operation enables the coil C to be transferred from the coil placing table 42 to the coil conveyor after shaping the coil C.

Further, the coil holding section 40 includes a proximal end shaping portion 45 configured to form the edgewise bent portion Be1 in the most proximal end side of the bus bar portion B. The proximal end shaping portion 45 is formed in the coil supporting base 41 such that a side surface thereof contacts with the outer side surface of the bus bar portion B of the coil C on the lowered coil placing table 42. In addition, an edgewise shaping surface 47 is formed in a distal end portion (end portion near the first shaping die 10) of the proximal end shaping portion 45. The edgewise shaping surface 47 is a curved surface (cylindrical curved surface) corresponding to the edgewise bent portion Be1.

The first driving device 50 includes a motor M1 that is controlled by the controller 100 so as to apply a rotational torque (driving force) to the drive shaft S1. The first driving device 50 drives and rotates the drive shaft S1 by the motor M1 so as to rotate (turn) the first shaping die 10 about the rotational axis RA in normal and reverse directions. The second driving device 60 includes a motor M2 that is controlled by the controller 100 so as to apply a rotational torque (driving force) to the drive shaft S2. The second driving device 60 drives and rotates the drive shaft S2 by the motor M2 so as to rotate (turn) the second shaping die 20 about the rotational axis RA in normal and reverse directions.

The controller 100 of the conductor shaping apparatus 1 includes a computer with a CPU, ROM, RAM and the like, driving circuits for the motor M1 of the first driving device 50 and the motor M2 of the second driving device 60, a control circuit for the driving mechanism of the coil holding section 40, and the like. The controller 100 acquires a signal from a rotational sensor (not shown) that is included in the first driving device 50 and detects a rotational position of either the rotational shaft of the motor M1 or the drive shaft S1, a signal from a rotational sensor (not shown) that is included in the second driving device 60 and detects a rotational position of either the rotational shaft of the motor M2 or the drive shaft S2, and the like.

Further, in the controller 100, hardware such as the CPU, driving circuits and the like and previously installed programs cooperate to form a control module for the first driving device 50, a control module for the second driving device 60, a control module for the coil holding section 40, and the like as functional blocks. The control module for the first driving device 50 is programmed to control the motor M1 so that the drive shaft S1 is rotated at a desired rotational speed in a desired rotational direction (rotational speed control). Further, the control module for the first driving device 50 is programmed to control the motor M1 so that a desired rotational torque is applied to the drive shaft S1 (torque control). Similarly, the control module for the second driving device 60 is programmed to control the motor M2 so that the drive shaft S2 is rotated at a desired rotational speed in a desired rotational direction (rotational speed control). Further, the control module for the second driving device 60 is programmed to control the motor M2 so that a desired rotational torque is applied to the drive shaft S2 (torque control). The control module for the coil holding section 40 is programmed to control the driving mechanism (not shown) in accordance with progress of shaping the bus bar portion B by the conductor shaping apparatus 1 so as to vertically move the coil placing table 42 and the coil pressing plate 44.

The following describes a shaping procedure of the bus bar portion B of the coil C by the above conductor shaping apparatus 1.

At a start of shaping of the bus bar portion B by the conductor shaping apparatus 1, the controller 100 moves the first and second shaping dies 10 and 20 to respective initial positions shown in FIG. 3 so that the second shaping die 20 is separated from the first shaping die 10. Further, the controller 100 controls the driving mechanism of the coil holding section 40 so as to raise the coil placing table 42 and the coil pressing plate 44 to respective initial positions shown in FIG. 3. The coil conveyor conveys the coil C that is wound by a coil winder and includes the unshaped bus bar portion B to the coil holding section 40 and places the coil C on the coil placing table 42.

Figure 6:
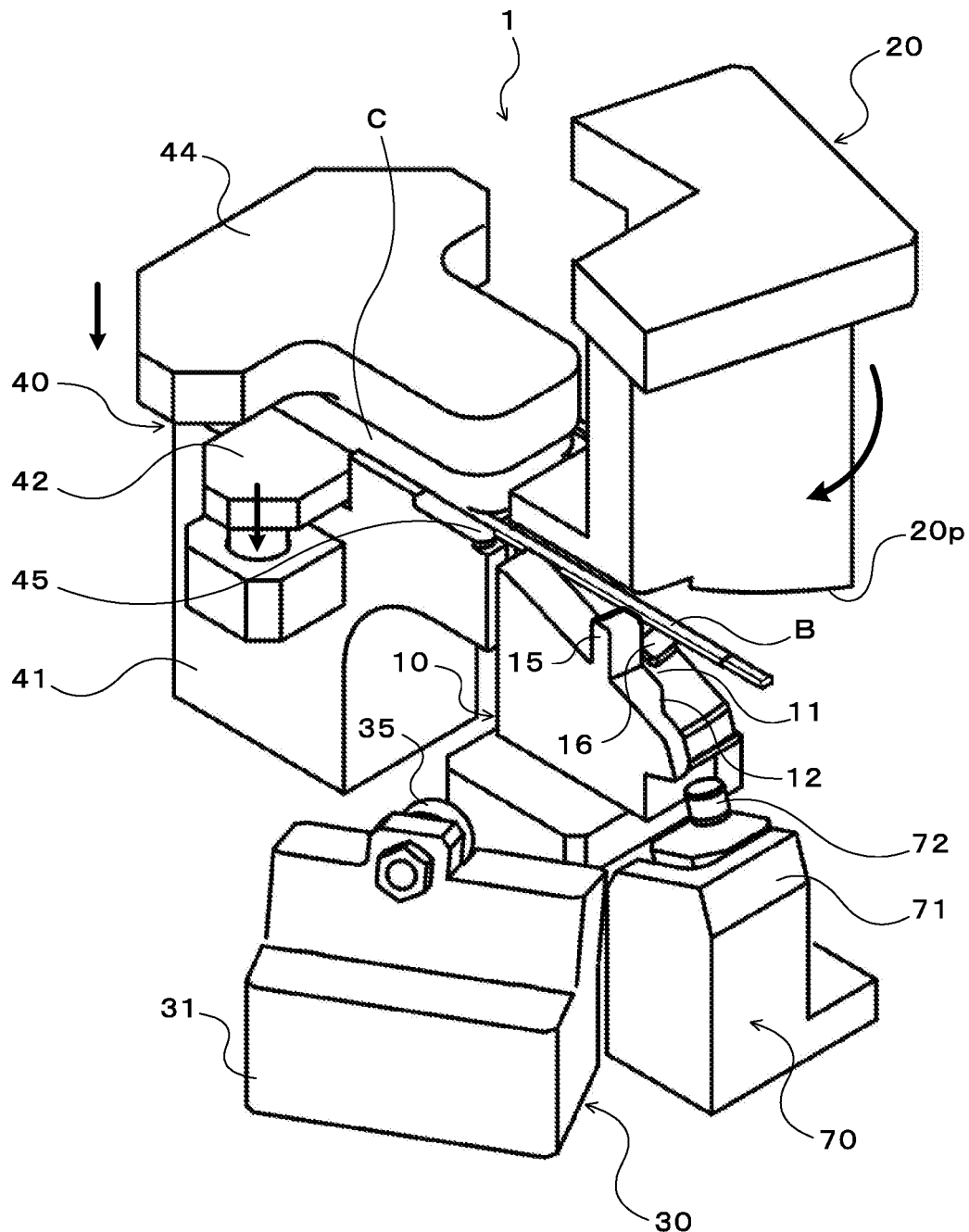
FIG. 6 is a perspective view illustrating an operation of the conductor shaping apparatus according to the disclosure.
Figure 7:
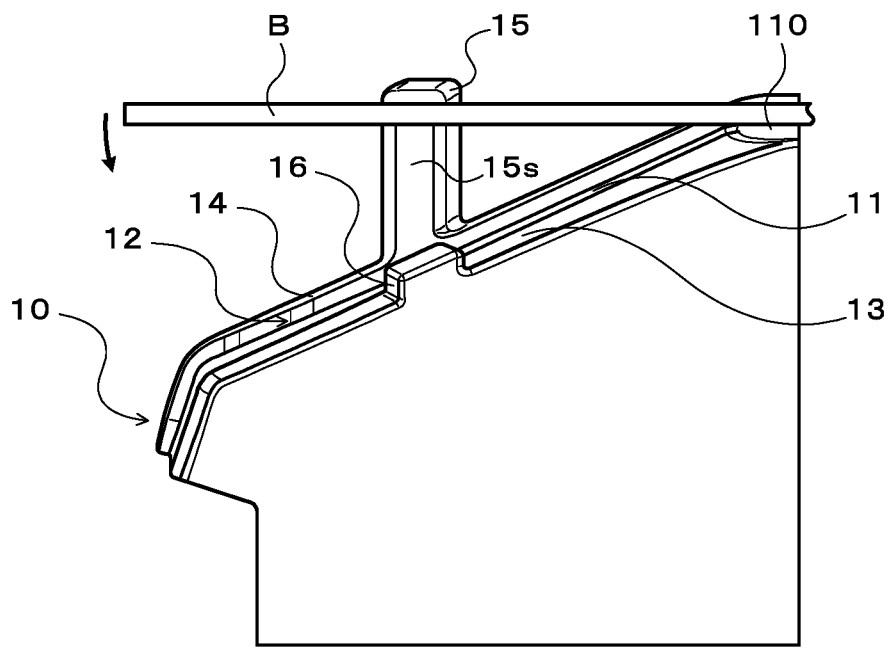
FIG. 7 is a plan view illustrating the operation of the conductor shaping apparatus according to the disclosure.

When the coil C is placed on the coil placing table 42, the controller 100 controls the driving mechanism of the coil holding section 40 so that the coil placing table 42 is lowered and the coil pressing plate 44 contacts with the coil C as shown in FIG. 6. As a result, the coil C is securely held (clamped) by the coil holding section 40. When the coil placing table 42 is lowered, as shown in FIG. 7, the bus bar portion B of the coil C horizontally extends (straight) and a portion of the lower surface (surface including the long side of the cross section of the rectangular wire) of the bus bar portion B contacts with the flat surface 110 in the most upper side of the first flatwise shaping surface 11 of the first shaping die 10. A portion of the outer side surface (side surface including the short sides) of the bus bar portion B partially opposes to the first contact surface 15$s$ (upper end) of the first movement restricting portion 15 of the first shaping die 10. Further, a portion of the outer side surface of the bus bar portion B contacts with both the side surface of the proximal end shaping portion 45 of the coil holding section 40 and a portion of the first edgewise shaping surface 12 of the first shaping die 10.

Then, the controller 100 controls the motor M2 of the second driving device 60 so as to rotate the second shaping die 20 with respect to the first shaping die 10 in a clockwise direction in FIG. 6 by a predetermined angle 91 about the rotational axis RA. The angle θ1 is defined in consideration of springback of the bus bar portion B (rectangular wire)

such that a space between the first edgewise shaping surface 12 of the first shaping die 10 and the second edgewise shaping surface 22 of the second shaping die 20 becomes substantially the same as a width of the bus bar portion B when the second shaping die is rotated by the angle θ1 from the initial position.

The second shaping die 20 that is rotated about the rotational axis RA gradually approaches the first shaping die 10 and the first and second movement restricting portions 15 and 16 of the first shaping die 10 are inserted into the recessed portion 25 of the second shaping die 20. As a result, the second shaping die 20 is rotated about the rotational axis RA with respect to the first shaping die 10 without interference between the second shaping die 20 and the first and second movement restricting portions 15 and 16. Further, according to the rotation of the second shaping die 20 in a direction approaching the first shaping die 10, the bus bar portion B of the coil C held by the coil holding section 40 is gradually pressed downward in FIG. 7 in the flatwise direction by the pressing surface 20p of the second shaping die 20. Further, a portion of the bus bar portion B is pressed by the pressing surface 20p of the second shaping die 20 so as to contact with the first contact surface 15s of the first movement restricting portion of the first shaping die 10. As a result, the bus bar portion B is moved (deformed) in the flatwise direction while being guided by the first contact surface 15s of the first movement restricting portion 15 so as not to move (to be rotated) about the rotational axis RA together with the second shaping die 20. That is, the first movement restricting portion 15 contacts with the portion of the bus bar portion B so as to restrict a movement of the bus bar portion B together with the second shaping die 20 when the second shaping die 20 is rotated in the direction approaching the first shaping die 10.

According to an increase in a rotational angle of the second shaping die 20, the bus bar portion B is clamped between the first flatwise shaping surface 11 of the first shaping die 10 and the second flatwise shaping surface 21 of the second shaping die 20 so as to be gradually bent in the flatwise direction. Further, the bus bar portion B is inserted between the first edgewise shaping surface 12 and the second contact surface 16s of the second movement restricting portion 16 while being guided by the first movement restricting portion 15 of the first shaping die 10. When the rotational angle of the second shaping die 20 becomes larger, the bus bar portion B is clamped between the first edgewise shaping surface 12 of the first shaping die 10 and the second edgewise shaping surface 22 of the second shaping die 20 so as to be gradually bent in the edgewise direction. In the conductor shaping apparatus 1, when the second shaping die 20 is rotated in the direction approaching the first shaping die 10, the movement of the bus bar portion B together with the second shaping die 20 is restricted by the first movement restricting portion 15 even though the second shaping die 20 presses the bus bar portion B forward in a rotational direction of the second shaping die 20, thereby enabling the bus bar portion B to properly contact with the first and second flatwise shaping surfaces 11, 21 and the first and second edgewise shaping surfaces 12, 22.

Figure 8:
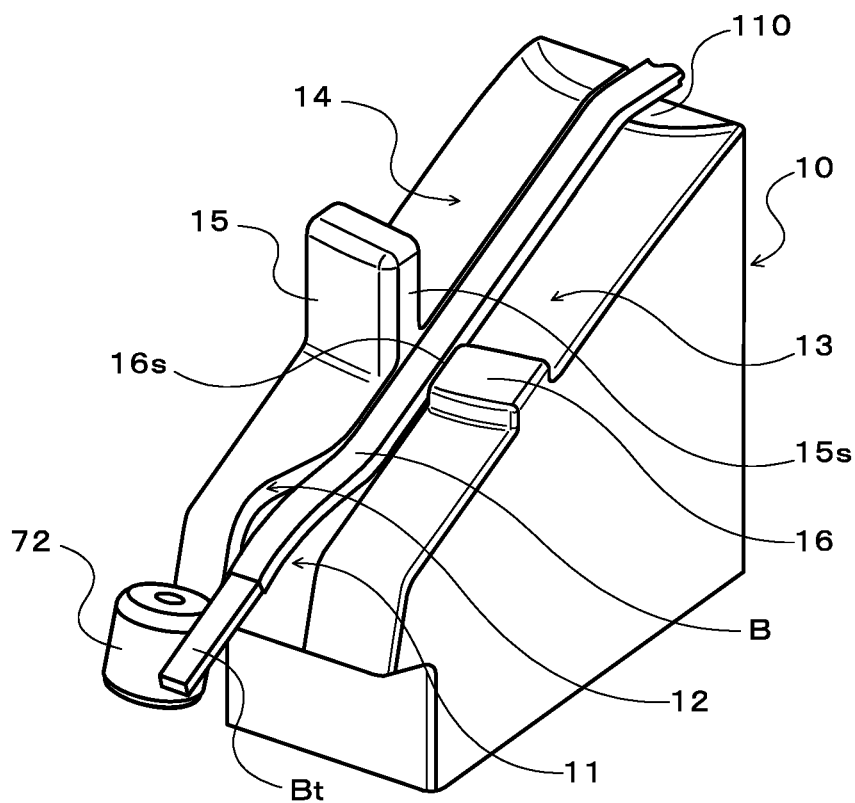
FIG. 8 is a perspective view illustrating the operation of the conductor shaping apparatus according to the disclosure.
Figure 9:
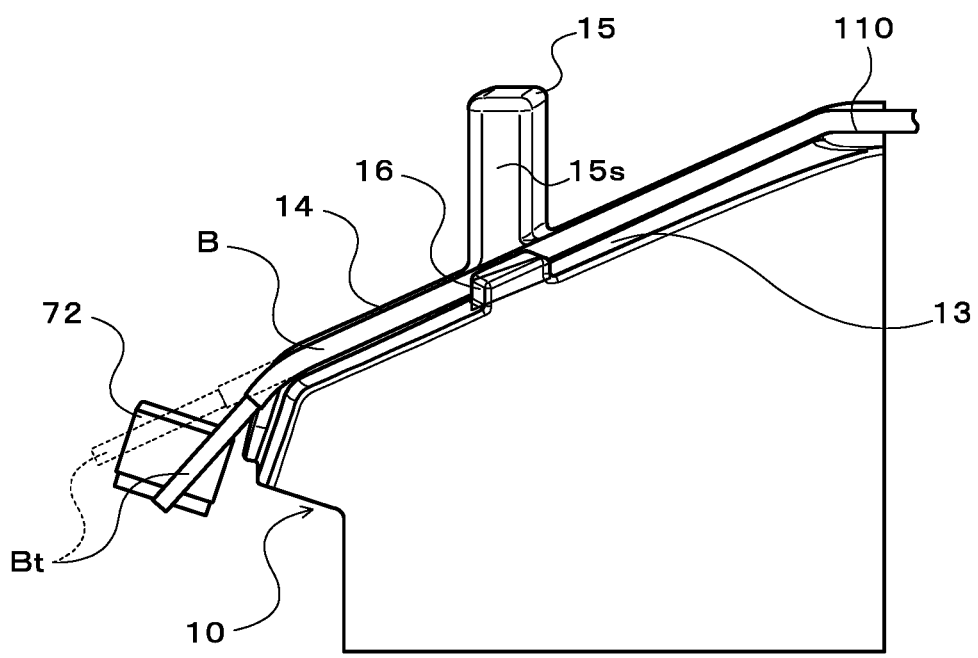
FIG. 9 is a plan view illustrating the operation of the conductor shaping apparatus according to the disclosure.
Figure 10:
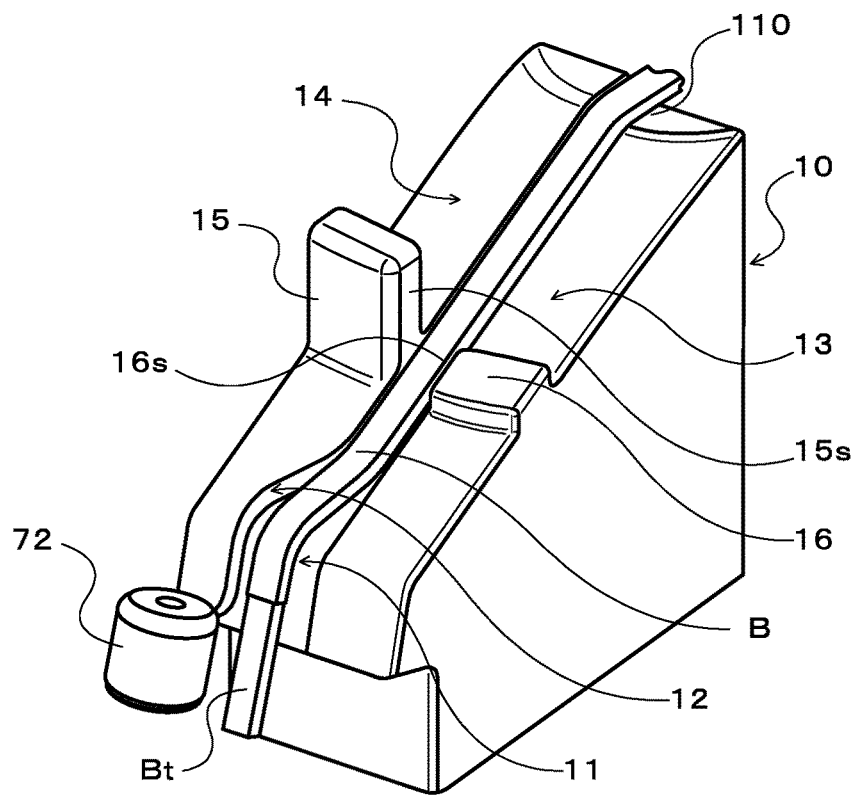
FIG. 10 is a perspective view illustrating the operation of the conductor shaping apparatus according to the disclosure.
Figure 11:
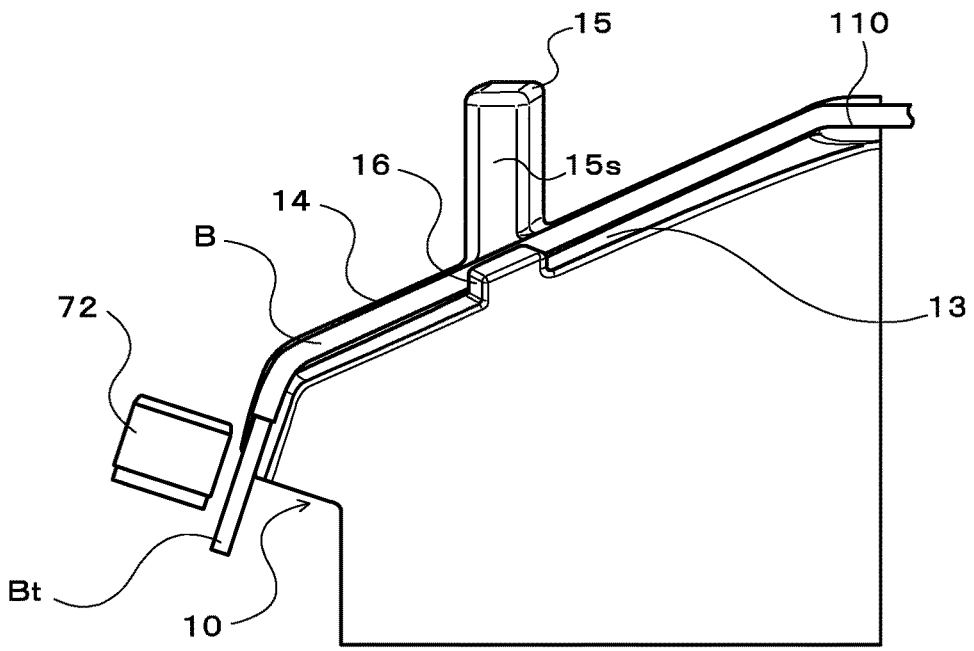
FIG. 11 is a plan view illustrating another conductor shaping apparatus according to the disclosure.

As the bus bar portion B is pressed downward in the flatwise direction by the second shaping die 20, an outer side surface of a distal end portion Bt (where the insulating layer is removed) of the bus bar portion B contacts with an outer surface of the guide roller 72 of the bus bar guide portion 70 as shown in FIG. 8. Further, as shown in FIG. 9, the outer side surface of the distal end portion Bt of the bus bar portion B contacts with the outer surface of the guide roller 72 of the bus bar guide portion 70 when the bus bar portion B is gradually bent in the edgewise direction by a relative movement of the first and second shaping dies 10 and 20. On the other hand, as shown in FIGS. 10 and 11, a contact between the distal end portion Bt of the bus bar portion B and the outer surface of the guide roller 72 is gradually released as the bus bar portion B is bent in the flatwise direction by the relative movement of the first and second shaping dies 10 and 20. Thus, the bus bar portion B is bent in the edgewise direction and the flatwise direction while preventing the bus bar portion B to run on the stepped portion 14 over the first edgewise shaping surface 12 of the first shaping die 10 when the second shaping die 20 is rotated in the direction approaching the first shaping die 10.

Figure 12:
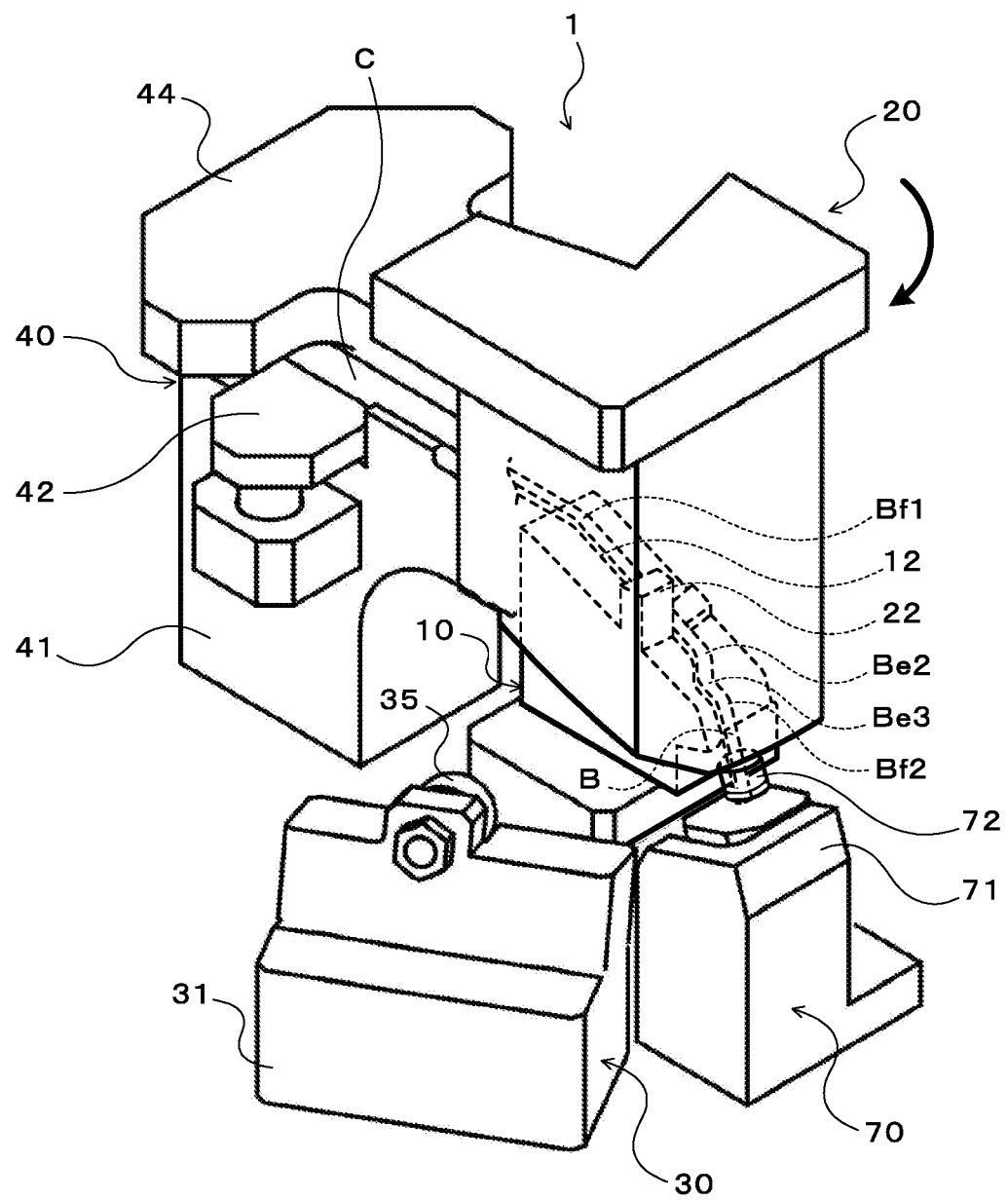
FIG. 12 is a perspective view illustrating the operation of another conductor shaping apparatus according to the disclosure.

As a result, the edgewise bent portions Be2, Be3 and the flatwise bent portions Bf1, Bf2 are accurately formed in the bus bar portion B as shown in FIG. 12 when the rotational angel of the second shaping die 20 becomes the predetermined angle θ1. Further, the distal end portion Bt of the bus bar portion B protrudes outward via a clearance between the first and second shaping dies 10 and 20 and is opposed to the outer surface of the guide roller 27 at an interval (refer to FIGS. 10 and 11) when the second shaping die 20 is rotated by the angle 81 about the rotational axis RA.

In the embodiment, the controller 100 controls the motor M2 of the driving device GO so that the drive shaft S2 is rotated at a predetermined rotational speed until a predetermined time elapses after a start of the rotation of the second shaping die (rotational speed control). For example, the predetermined time is predetermined as a time until a portion of the bus bar portion B pressed by the pressing surface 20p of the second shaping die 20 contacts with the first edgewise shaping surface 12 of the first shaping die 10 after the start of the rotation of the second shaping die 20. The rotational speed control of the motor M2 while the bus bar portion B is pressed by the pressing surface 20p satisfactorily reduces a time required to form the edgewise bent portions Be2, Be3 and the flatwise bent portions Bf1, Bf2 in the bus bar portion B.

When the above predetermined time has elapsed after the start of the rotation of the second shaping die 20, the controller 100 controls the motor M2 of the second driving device 60 so as to apply a predetermined rotational torque to the drive shaft S2 (torque control). Simultaneously with the torque control of the motor M2, the controller 100 controls the motor M1 of the first driving device 50 so as to apply a torque for stopping the first shaping die 10 at the initial position to the drive shaft S1. As a result, the bus bar portion B is tightly clamped between the first and second shaping dies 10 and 20 when shaping the bus bar portion B while rotating the second shaping die 20 with respect to the first shaping die 10, thereby accurately forming the edgewise bent portions Be2, Be3 and the flatwise bent portions Bf1, Bf2.

When the rotational angle of the second shaping die 20 becomes the angle θ1, the controller 100 controls the motors M1 and M2 of the first and second driving devices 50 and 60 so that the first and second shaping dies 10 and 20 are integrally rotated about the rotational axis RA in the clockwise direction in FIG. 12 by a predetermined angle θ2 therefrom. In the embodiment, a rotational direction of the first and second shaping dies 10 and 20 that are integrally rotated is the same as the rotational direction of the second shaping die 20 with respect to the first shaping die 10 when shaping the bent portions Be2, Be3, Bf1 and Bf2. On this occasion, the controller 100 controls the motors M1 and M2 of the first and second driving devices 50 and 60 so as to rotate the first and second shaping dies 10 and 20 about the rotational axis RA at a same rotational speed. The rotation of the motor M2 of the second driving device 60 or the rotation of the second shaping die 20 may be once stopped when the second shaping die 20 is rotated about the rotational axis RA by the predetermined angle θ1 with respect to the first shaping die 10.

Figure 13:
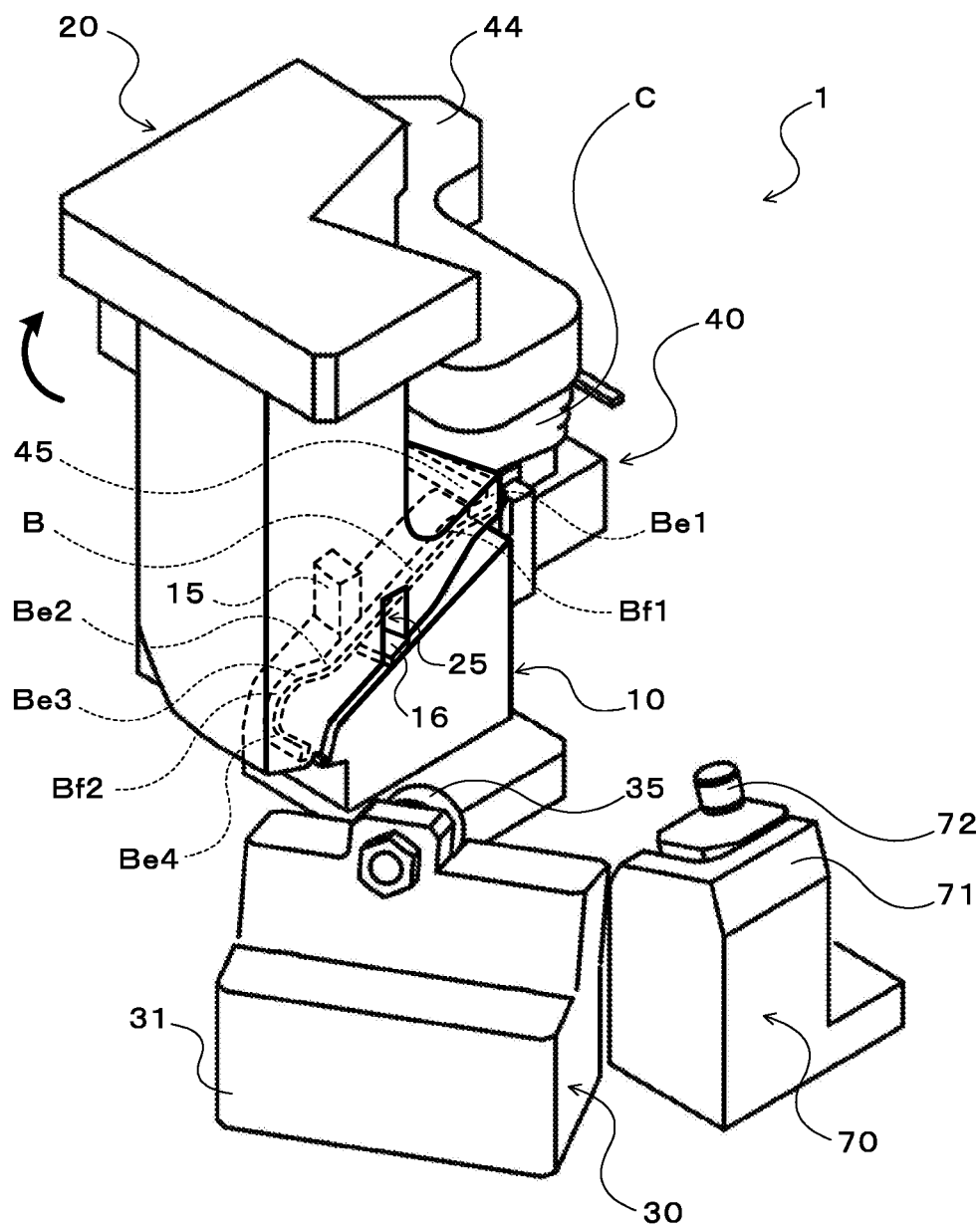
FIG. 13 is a perspective view illustrating the operation of another conductor shaping apparatus according to the disclosure.

When the first and second shaping dies 10 and 20 are integrally rotated, a portion of the bus bar portion B between the portion (proximal end) of the bus bar portion B restrained by the proximal end shaping portion 45 of the coil holding section 40 and the portion of the bus bar portion B clamped between the first and second shaping dies 10 and 20 (the first and second edgewise shaping surfaces 12 and 22) is pressed against the edgewise shaping surface 47 of the proximal end shaping portion 45 so as to be bent in the edgewise direction. As a result, as shown in FIG. 13, the edgewise bent portion Be1 in the most proximal end side is formed in the bus bar portion B by integrally rotating the first and second shaping dies 10 and 20 about the rotational axis RA by the angle θ2. On this occasion, the bus bar portion B is tightly clamped between the first and second shaping dies 10 and 20 that are rotated about the rotational axis RA at the same rotational speed, so that the edgewise bent portion Be1 in the most proximal end side is accurately formed in the bus bar portion B.

Further, when the first and second shaping dies 10 and 20 are integrally rotated, the outer side surface (left side surface in FIG. 12) of the distal end portion Bt of the bus bar portion B that protrudes outward via the clearance between the first and second shaping dies 10 and 20 contacts with the shaping roller 35 of the distal end shaping portion 30 on a downstream side of the initial position of the first shaping die 10 (where the first and second shaping dies 10 and 20 start rotating integrally) in the rotational direction of the first and second shaping dies 10 and 20. In response to the rotation of the first and second shaping dies 10 and 20, the shaping roller 35 rolls on the outer side surface of the distal end portion Bt of the bus bar portion B that is rotated while being held by the first and second shaping dies 10 and 20 (the first and second edgewise shaping surfaces 12 and 22). The distal end portion Bt of the bus bar portion B is pressed by the shaping roller 35 to be bent in a direction opposite to the rotational direction of the first and second shaping dies 10 and 20. That is, the distal end portion Bt of the bus bar portion B is bent in the edgewise direction so as to extend in a direction opposite to an extending direction of the edgewise bent portion Be1 in the most proximal end side.

As a result, as shown in FIG. 13, the edgewise bent portion Be4 in the most distal end side is formed in the bus bar portion B by integrally rotating the first and second shaping dies 10 and 20 about the rotational axis RA by the angle θ2. On this occasion, the bus bar portion B is tightly clamped between the first and second shaping dies 10 and 20 that are rotated about the rotational axis RA at the same rotational speed, so that the edgewise bent portion Be4 in the most distal end side is accurately formed in the bus bar portion B. Further, the shaping roller 35 forms the edgewise bent portion Be4 while rolling on the outer side surface of the distal end portion Bt of the bus bar portion B, thereby reducing small scratches on the distal end portion Bt (where the insulating layer is removed) of the bus bar portion B. The angle θ2 for integrally rotating the first and second shaping dies 10 and 20 is defined in consideration of bent angles of the edgewise bent portions Be1 and Be4 and the springback of the bus bar portion B (rectangular wire).

When the rotational angle of the first and second shaping dies 10 and 20 becomes the angle θ2 and the edgewise bent portions Be1 and Be4 are formed completely, the controller 100 stops the motors M1 and M2 of the first and second driving devices 50 and 60 so as to stop the rotation of the first and second shaping dies 10 and 20. Then, the controller 100 controls the motor M2 of the second driving device 60 so that the second shaping die 20 is rotated about the rotational axis RA in a direction apart from the first shaping die 10 and returns to the initial position. On this occasion, the controller 100 controls the motor M2 of the second driving device 60 so that the drive shaft S2 is rotated at a predetermined rotational speed (rotational speed control).

Here, the bus bar portion B is pressed against the first and second flatwise shaping surfaces 11, 21 and the first and second edgewise shaping surfaces 12, 22 of the first and second shaping dies 10 and 20 by the springback (especially, springback in the flatwise direction) generated during shaping (bending) the edgewise bent portions Be2, Be3 and the flatwise bent portions Bf1, Bf2. Thus, the bus bar portion B may be dragged and deformed by the second shaping die 20 when the second shaping die 20 is rotated so as to be separated from the first shaping die 10, so that the shaping accuracy (especially, a dimensional accuracy in a bending height) of the edgewise bent portions Be2, Be3 and the flatwise bent portions Bf1, Bf2 may deteriorate.

By taking into account the foregoing, the second movement restricting portion 16 is formed in the first shaping die 10 of the conductor shaping apparatus 1 of the embodiment. The second movement restricting portion 16 contacts with a portion of the inner side surface (side surface on the second edgewise shaping surface 22 side) of the bus bar portion B so as to restrict the movement of the bus bar portion B together with the second shaping die 20. Thus, the bus bar portion B is smoothly separated from the second flatwise shaping surface 21 and the second edgewise shaping surface 22 of the rotated (moved) second shaping die 20 even though the bus bar portion B is pressed against the first and second flatwise shaping surfaces 11, 21 and the first and second edgewise shaping surfaces 12, 22 by the springback generated during shaping.

As a result, the conductor shaping apparatus 1 prevents the bus bar portion B from being dragged and deformed by the second shaping die 20 when the second shaping die 20 is rotated in the direction apart from the first shaping die 10, thereby accurately forming the edgewise bent portions Be2, Be3 and the flatwise bent portions Bf1, Bf2. In the conductor shaping apparatus 1 in which the second shaping die 20 is rotated about the rotational axis RA so as to be separated from the first shaping die 10, relatively large moment about the rotational axis RA acts on an outer portion in the radial direction of the first shaping die 10 of the bus bar portion B that is dragged by the second shaping die 20. Accordingly, the above second movement restricting portion 16 of the first shaping die 10 is advantageous to prevent the bus bar portion B from being deformed when the first and second shaping dies 10 and 20 are separated each other.

Figure 14:
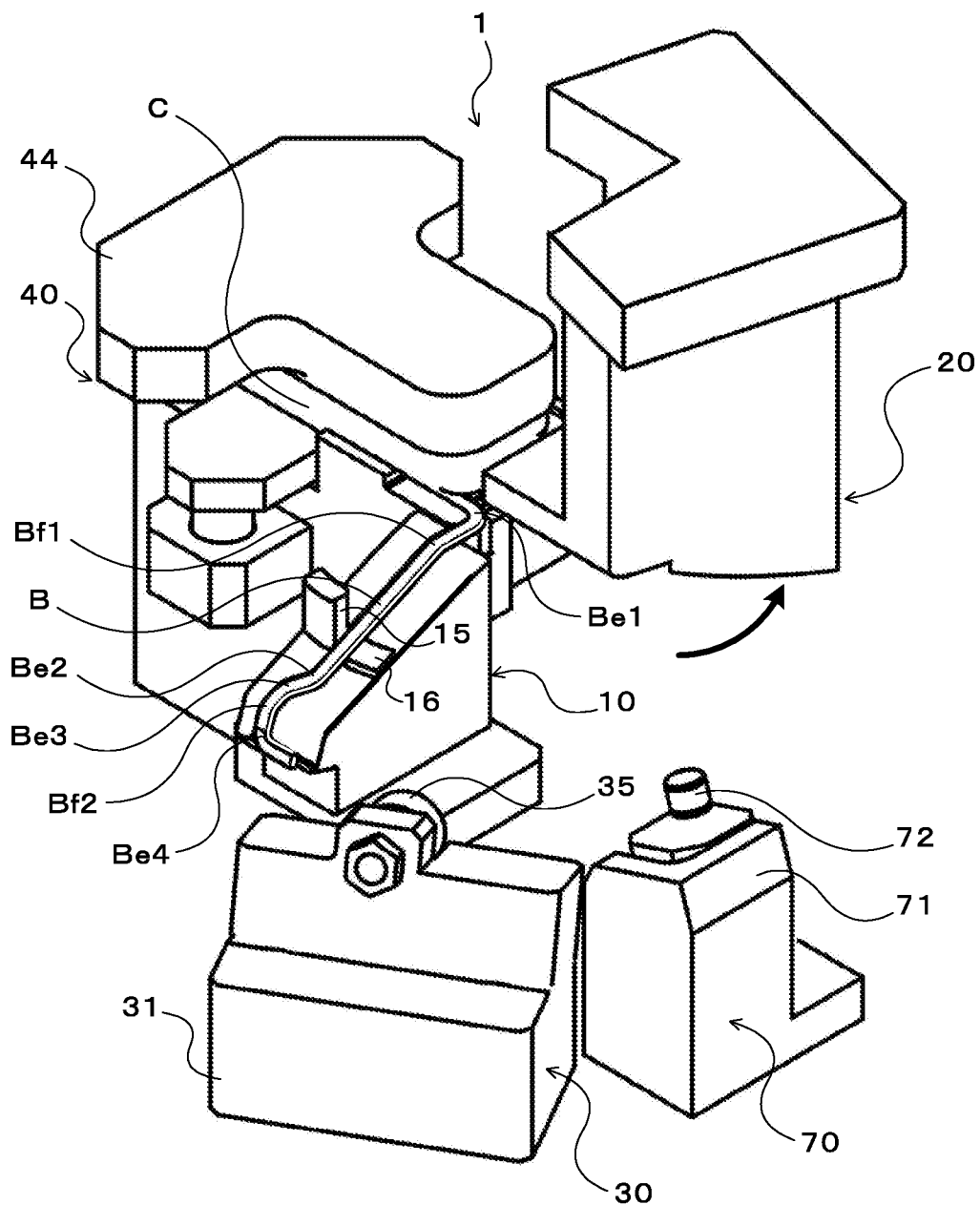
FIG. 14 is a perspective view illustrating the operation of another conductor shaping apparatus according to the disclosure.
Figure 15:
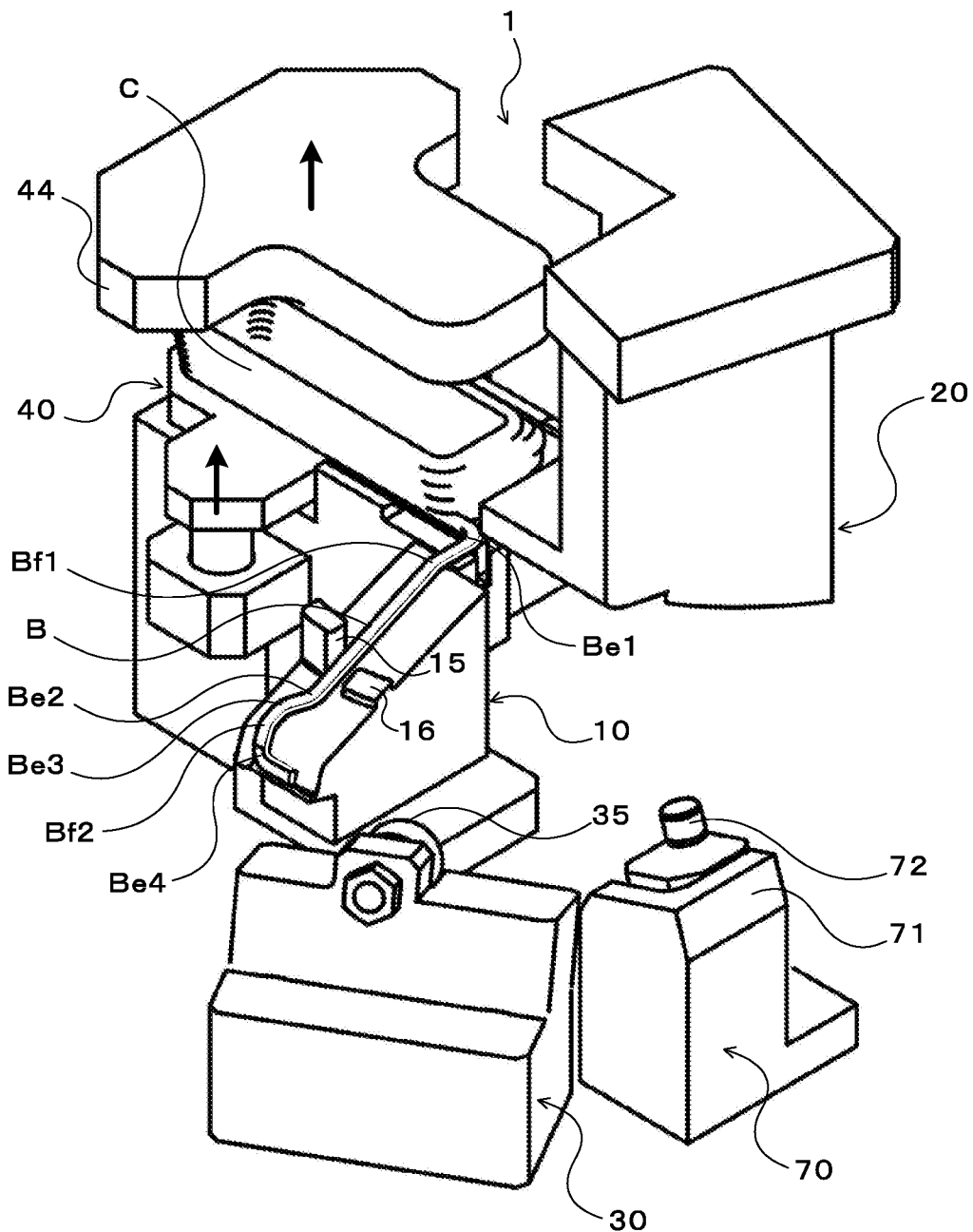
FIG. 15 is a perspective view illustrating the operation of another conductor shaping apparatus according to the disclosure.

When the second shaping die 20 returns to the initial position as shown in FIG. 14, the controller 100 controls the driving mechanism of the coil holding section 40 so as to raise the coil placing table 42 and the coil pressing plate 44 to respective initial positions shown in FIG. 3. Thus, as shown in FIG. 15, the coil pressing plate 44 is separated from the coil C and the coil C is raised together with the coil placing table 42. Then, the coil C with the shaped bus bar portion B is transferred to the coil conveyor (not shown). After that, the plurality of edgewise bent portions Be1-Be4 and the plurality of flatwise bent portions Bf1 and Bf2 are formed in the bus bar portion B by the conductor shaping apparatus 1 when the coil C with the unshaped bus bar portion B is placed on the coil placing table 42.

As has been described above, in the conductor shaping apparatus 1, the first movement restricting portion 15 contacts with the portion of the bus bar portion B when the second shaping die 20 is rotated in the direction approaching the first shaping die 10. Thus, the movement of the bus bar portion B together with the second shaping die 20 is restricted by the first movement restricting portion 15 even though the second shaping die 20 presses the bus bar portion B forward in the rotational direction of the second shaping die 20, so that the bus bar portion B is properly clamped between the first and second shaping dies 10 and 20. Further, the second movement restricting portion 16 contacts with the portion of the bus bar portion B so as to restrict the movement of the bus bar portion B together with the second shaping die 20 when the second shaping die 20 is rotated in the direction apart from the first shaping die 10. This configuration prevents the bus bar portion B from being dragged and deformed by the second shaping die 20 when the second shaping die 20 is rotated in the direction apart from the first shaping die 10 even though the bus bar portion B is pressed against the first and second flatwise shaping surfaces 11, 21 and the first and second edgewise shaping surfaces 12, 22 by the springback generated during shaping. As a result, the conductor shaping apparatus 1 enables the edgewise bent portions Be2, Be3 and the flatwise bent portions Bf1, Bf2 to be accurately formed in the bus bar portion B by rotating the second shaping die 20 about the rotational axis RA with respect to the first shaping die 10.

In the conductor shaping apparatus 1, the first movement restricting portion 15 protrudes upward from the surface of the stepped portion 14 including the first edgewise shaping surface 12 of the first shaping die 10 and includes the first contact surface 15s that continues to the portion of the first edgewise shaping surface 12 and extends upward. This configuration enables the bus bar portion B to properly contact with the first and second flatwise shaping surfaces 11, 21 and the first and second edgewise shaping surfaces 12, 22 when the second shaping die 20 is rotated in the direction approaching the first shaping die 10. On the other hand, the second movement restricting portion 16 protrudes upward from the guide surface 13 adjacent to the first flatwise shaping surface 11 so as to oppose to the portion of the first edgewise shaping surface 12. This configuration satisfactorily prevents the bus bar portion B from being dragged and deformed by the second flatwise shaping surface 21 and the second edgewise shaping surface 22 of the second shaping die 20 when the second shaping die 20 is rotated in the direction apart from the first shaping die 10.

The first and second movement restricting portions 15 and 16 are arranged in the first shaping die 10 along the circular arc that extends about the rotational axis RA so as to be respectively adjacent to the first flatwise shaping surface 11. Further, the second shaping die 20 includes the circular arc recessed portion 25 that is formed such that the first and second movement restricting portions 15 and 16 of the first shaping die 10 are inserted into the recessed portion 25 when the second shaping die 20 is rotated in the direction approaching the first shaping die 10. As a result, the movement of the bus bar portion B is properly restricted by the first and second movement restricting portions 15 and 16 of the first shaping die 10 and the interference between the second shaping die 20 and the first and second movement restricting portions 15, 16 is prevented.

The conductor shaping apparatus 1 further includes the bus bar guide portion 70 and the guide roller 72 of the bus bar guide portion 70 contacts with the outer side surface of the distal end portion Bt of the bus bar portion B when the bus bar portion B is gradually bent in the edgewise direction. Then, the contact between the guide roller 72 and the distal end portion Bt of the bus bar portion B is released as the bus bar portion B is gradually bent in the flatwise direction. This configure enables the bus bar portion B to be bent in the edgewise and flatwise directions while preventing the bus bar portion B to run on the stepped portion 14 over the first edgewise shaping surface 12 of the first shaping die 10 when the second shaping die 20 is rotated in the direction approaching the first shaping die 10. As a result, the edgewise bent portions Bet, Be3 and the flatwise bent portions Bf1, Bf2 are more accurately formed in the bus bar portion B.

Figure 16:
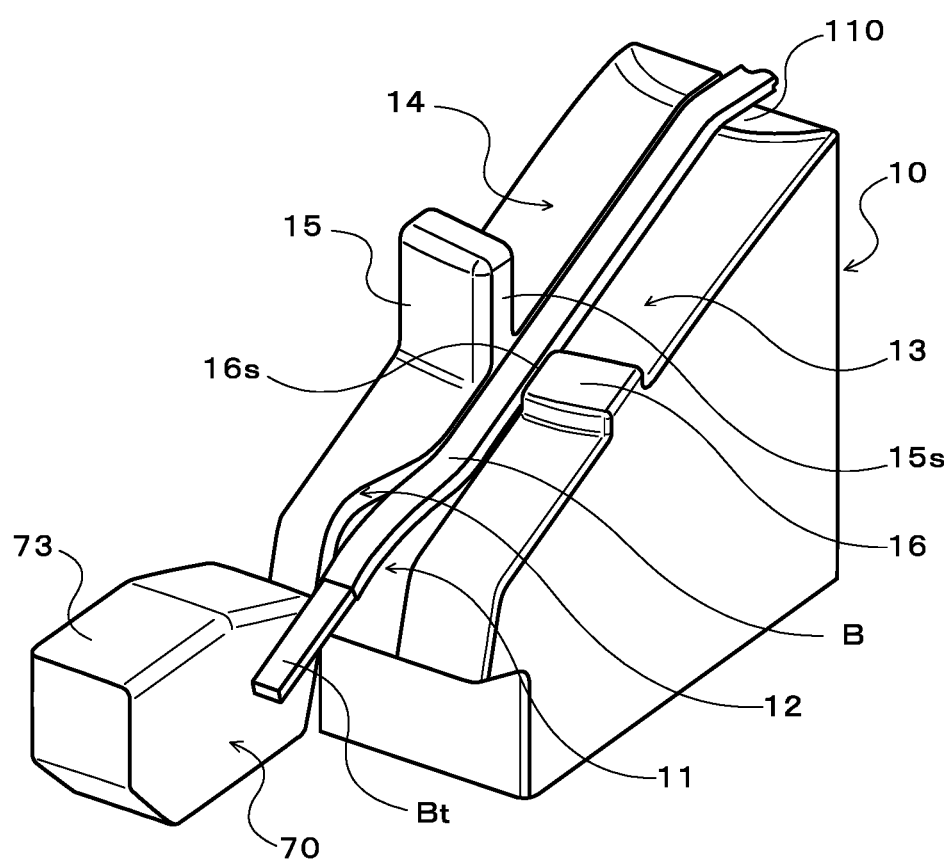
FIG. 16 is a perspective view illustrating a modification of a conductor guide portion of the conductor shaping apparatus according to the disclosure.

The bus bar guide portion 70 includes the supporting block 71 that is fixed to the installation place of the conductor shaping apparatus 1 and the guide roller 72 that is rotatably supported by the supporting block 71 so as to contact with the outer side surface of the distal end portion Bt of the bus bar portion B. This configuration reduces small scratches on the distal end portion Bt (where the insulating layer is removed) of the bus bar portion B and enables the bus bar portion B to be properly guided. As shown in FIG. 16, the bus bar guide portion 70 may include a shaping member 73 that does not include a movable section instead of the guide roller 72.

Further, the conductor shaping apparatus 1 includes the first driving device 50 configured to apply the rotational torque (driving force) to the first shaping die 10 and to rotate the first shaping die 10 about the rotational axis RA, and the second driving device 60 configured to apply the rotational torque (driving force) to the second shaping die 20 and to rotate the second shaping die 20 about the rotational axis RA. The first driving device 50 applies the rotational torque or the torque for stopping the first shaping die 10 at the initial position to the first shaping die 10 and the second driving device 60 applies the rotational torque to the second shaping die 20 when the second shaping die 20 is rotated in the direction approaching the first shaping die 10 so that the bus bar portion B is tightly clamped between the first and second shaping dies 10 and 20, thereby enabling the edgewise bent portions Be2, Be3 and the flatwise bent portions Bf1, Bf2 to be accurately formed in the bus bar portion B.

Further, the conductor shaping apparatus 1 rotates the first and second shaping dies 10 and 20 integrally about the rotational axis RA, so that the edgewise bent portions Be1 and Be4 are formed in the bus bar portion B of the coil C held by the coil holding section 40. On this occasion, the first driving device 50 applies the rotational torque to the first shaping die 10 and the second driving device 60 applies the rotational torque to the second shaping die 20 so as to maintain a state where the bus bar portion B is tightly clamped between the first and second shaping dies 10 and 20, thereby enabling the edgewise bent portions Be1 and Be4 to be accurately formed in the bus bar portion B. In addition, the edgewise bent portion Be1 in the most proximal end side and the edgewise bent portion Be4 in the most distal end side are accurately formed in the bus bar portion B by the proximal end shaping portion 45 with a simple structure and the distal end shaping portion 30 with a simple structure without using shaping sections including a movable section such as a cam mechanism or a dedicated driving device when integrally rotating the first and second shaping dies 10 and 20 about the rotational axis RA.

In the conductor shaping apparatus 1, the controller 100 may be configured to control the motors M1 and M2 of the first and second driving devices 50 and 60 so as to make the torque applied to the second shaping die 20 on a rear side in the rotational direction become equal to or larger than the torque applied to the first shaping die 10 on a front side in the rotational direction when the first and second shaping dies 10 and 20 are integrally rotated about the rotational axis RA. In this configuration, the bus bar portion B is tightly clamped between the first and second shaping dies 10 and 20 when forming the edgewise bent portions Be1 and Be4 in the bus bar portion B while integrally rotating the first and second shaping dies 10 and 20, so that the edgewise bent portions Be1 and Be4 are accurately formed in the bus bar portion B. In the conductor shaping apparatus 1, the rotational direction of the second shaping die 20 with respect to the first shaping die 10 when shaping the bus bar portion B may be contrary to the rotational direction of the first and second shaping dies 10 and 20 that are integrally rotated. This configuration enables a specific bent portion that is not formed by the conductor shaping apparatus in which the rotational direction of the second shaping die 20 with respect to the first shaping die 10 when shaping the bus bar portion B is the same as the rotational direction of the first and second shaping dies 10 and 20 that are integrally rotated even though shapes of the first and second shaping dies 10 and 20 are changed to be formed in the bus bar portion B. The distal end shaping portion 30 may include a shaping member that does not include a movable section such as a block member with an edgewise shaping surface or a belt instead of the shaping roller 35.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the conductor with the bent portion.

The invention claimed is:

1. A conductor shaping apparatus that includes a first shaping die, a second shaping die and a holding section configured to hold the conductor and is configured to rotate the second shaping die about a rotational axis with respect to the first shaping die so as to form an edgewise bent portion and a flatwise bent portion in the conductor held by the holding section, the conductor shaping apparatus comprising:
  a first movement restricting portion that is formed in the first shaping die and is configured to contact with a portion of the conductor so as to restrict a movement of the conductor together with the second shaping die when the second shaping die is rotated in a direction approaching the first shaping die; and
  a second movement restricting portion that is formed in the first shaping die and is configured to contact with a portion of the conductor so as to restrict the movement of the conductor together with the second shaping die when the second shaping die is rotated in a direction apart from the first shaping die.

2. The conductor shaping apparatus according to claim 1,
  wherein the first shaping die is a lower die disposed below the second shaping die and includes a first flatwise shaping surface configured to form the flatwise bent portion and a first edgewise shaping surface that extends along the first flatwise shaping surface so as to form the edgewise bent portion,
  wherein the second shaping die is an upper die formed not to interfere with the first and second movement restricting portions of the first shaping die and includes a second flatwise shaping surface configured to form the flatwise bent portion and a second edgewise shaping surface that extends along the second flatwise shaping surface so as to form the edgewise bent portion,
  wherein the first movement restricting portion protrudes upward from a surface of a stepped portion including the first edgewise shaping surface and includes a first contact surface that continues to a portion of the first edgewise shaping surface and extends upward, and
  wherein the second movement restricting portion protrudes upward from beside the first flatwise shaping surface so as to oppose to a portion of the first edgewise shaping surface.

3. The conductor shaping apparatus according to claim 2,
  wherein a height of the first movement restricting portion is defined so as to make an upper end of the first contact surface oppose to at least a portion of the conductor that is held by the holding section and extends horizontally, and
  wherein a height of the second movement restricting portion is defined equal to or smaller than a thickness of the conductor in a flatwise direction.

4. The conductor shaping apparatus according to claim 2,
  wherein the first and second movement restricting portions are arranged in the first shaping die along a circular arc that extends about the rotational axis so as to be respectively adjacent to the first flatwise shaping surface, and wherein the second shaping die configured to include a circular arc recessed portion into which the first and second movement restricting portions are inserted when the second shaping die is rotated in the direction approaching the first shaping die.

5. The conductor shaping apparatus according to claim 1, further comprising:
  a conductor guide portion that is disposed in an installation place of the conductor shaping apparatus so as to contact with a side surface of a distal end portion of the conductor when the conductor is gradually bent in an edgewise direction, the contact between the conductor guide portion and the conductor being released as the conductor is gradually bent in a flatwise direction.

6. The conductor shaping apparatus according to claim 1, further comprising:
  a first drive source configured to apply driving force to the first shaping die and to rotate the first shaping die about the rotational axis; and
  a second drive source configured to apply driving force to the second shaping die and to rotate the second shaping die about the rotational axis.

7. The conductor shaping apparatus according to claim 6, further comprising:
  a controller programmed to control the first and second drive sources so as to rotate the second shaping dies about the rotational axis with respect to the first shaping dies, the controller programmed to control the first and second drive sources so as to integrally rotate the first and second shaping dies about the rotational axis; and a distal end shaping portion configured to contact with a distal end portion of the conductor so as to form the edgewise bent portion in a most distal end side when the first and second shaping dies are integrally rotated about the rotational axis.

8. The conductor shaping apparatus according to claim 6, wherein the holding section includes a proximal end shaping portion configured to contact with the conductor so as to form the edgewise bent portion in a most proximal end side when the first and second shaping dies are integrally rotated about the rotational axis.

9. The conductor shaping apparatus according to claim 1, wherein the conductor is a bus bar portion that extends from one end of a coil, and wherein the holding section is configured to hold the coil.

* * * * *